O. L. SUTTON.
COTTON CHOPPER.
APPLICATION FILED AUG. 25, 1917.
1,254,548.
Patented Jan. 22, 1918.
3 SHEETS—SHEET 1.
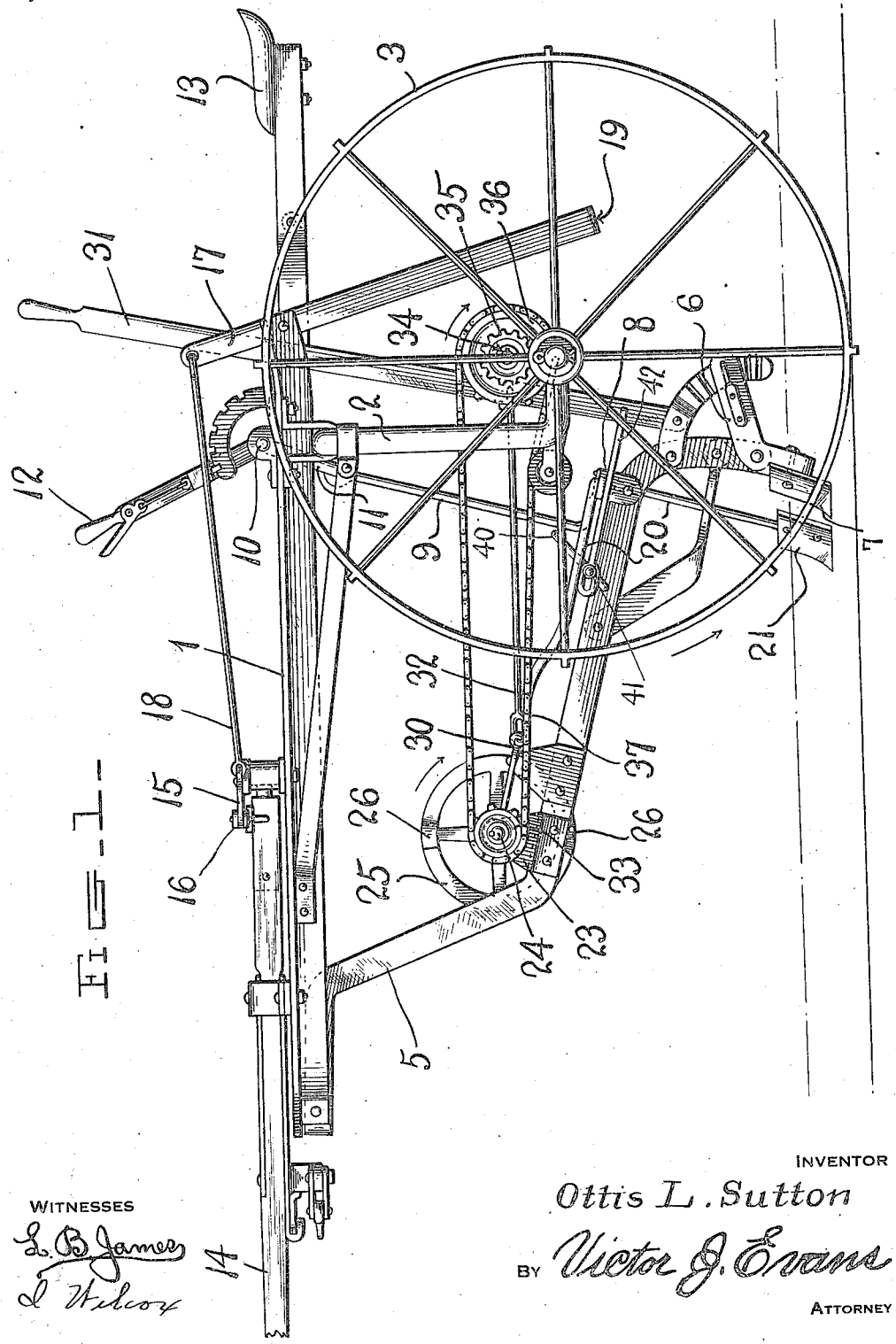
WITNESSES
L. B. James
L. Wilcox
INVENTOR
Ottis L. Sutton
BY Victor J. Evans
ATTORNEY

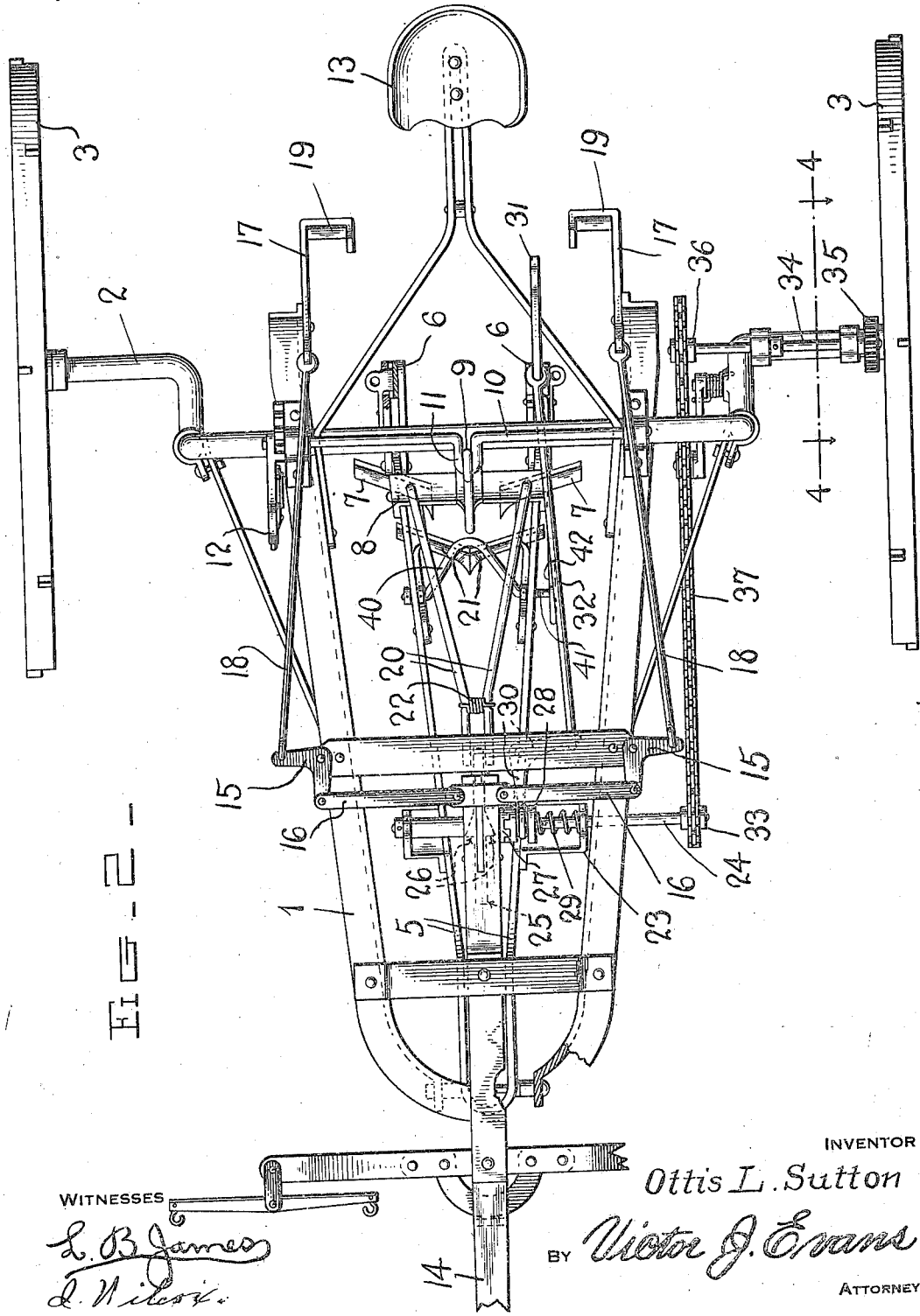

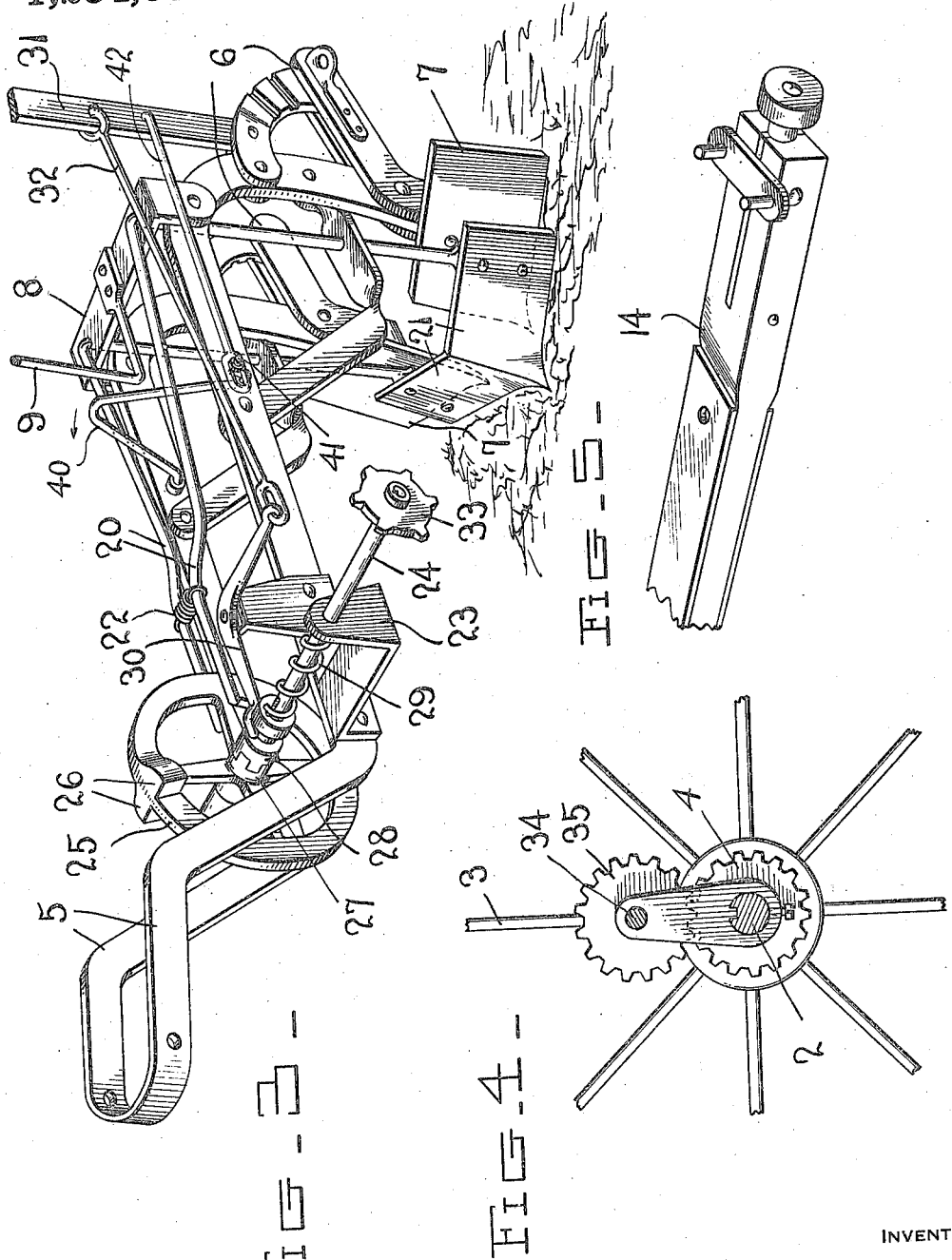

UNITED STATES PATENT OFFICE.

OTTIS LEWIS SUTTON, OF HICKMAN, KENTUCKY.

COTTON-CHOPPER.

1,254,548.

Specification of Letters Patent.

Patented Jan. 22, 1918.

Application filed August 25, 1917. Serial No. 188,133.

*To all whom it may concern:*

Be it known that I, OTTIS L. SUTTON, a citizen of the United States, residing at Hickman, in the county of Fulton and State of Kentucky, have invented new and useful Improvements in Cotton-Choppers, of which the following is a specification.

This invention relates to cotton chopping machines and it consists in the novel features hereinafter described and claimed.

An object of the invention is to provide a cotton chopper of simple and durable structural arrangement having means for cutting out undesirable plants in a standing row, the said means being adapted to be manually manipulated whereby it may skip or miss those plants which should remain standing and thus effect the thinning operation.

With this object in view the chopper comprises a wheel mounted frame with beams attached thereto. Plow points are adjustably carried by the beams and are adapted to operate in the soil at the opposite sides of the row of plants. Means are provided for raising and lowering the beams. Shafts are pivotally mounted upon the beams and carry at their lower ends blades which normally have their edges in close proximity to each other. A bracket is mounted upon the beams and carries a journaled disk which is adapted to operate between the said shafts for the purpose of turning the same so that the said blades which are mounted upon the shafts may be spread apart at intervals. Means are provided for returning the said shafts to their normal positions. Also means are provided for operating the said disk from one of the supporting wheels of the chopper.

In the accompanying drawings:—

Figure 1 is a side elevation of the cotton chopper.

Fig. 2 is a top plan view of the same.

Fig. 3 is a perspective view of the lower portion of the cotton chopper.

Fig. 4 is a detail sectional view of parts of the cotton chopper cut on the line 4—4 of Fig. 2.

Fig. 5 is a detail perspective view of the rear end of the cam used on the chopper.

The cotton chopper comprises a frame 1 which is mounted upon an arch axle 2 and the said axle in turn is mounted upon supporting wheels 3. A gear wheel 4 is fixed to the side of one of the wheels 3 and rotates with the same. Beams 5 are pivotally connected at their forward ends with the forward portion of the frame 1 and the said beams carry at their lower rear ends pivoted foot pieces 6 which may be secured at adjusted positions with relation to the said beams. Plow points 7 are adjustably mounted upon the foot pieces 6. A yoke 8 is connected with the rear portion of the beams 5 and a rod 9 is connected at its lower end with the said yoke. A shaft 10 is journaled upon the frame 1 and is provided at a point between its ends with an arm 11 which is operatively connected with the upper end of the rod 9. A handle 12 is mounted upon the shaft 10 and may be used by the occupant of the seat 13 which is mounted upon the frame 1 for turning the shaft 10 whereby the arm 11 is swung and the rod 9 is moved and consequently the rear ends of the beams 5 are raised or lowered. Thus means are provided for raising and lowering the plow points 7 with relation to the surface of the soil.

A tongue 14 is pivotally mounted upon the forward portion of the frame for horizontal swinging movement and bell crank members 15 are pivoted upon the said frame. Links 16 operatively connect the inner ends of the bell crank levers 15 with the rear portion of the tongue 14. Levers 17 are fulcrumed upon the rear portion of the frame 1 and the upper ends of the said levers 17 are operatively connected at the outer ends of the bell crank levers 15 by means of rods 18. The levers 17 are provided at their lower ends with stirrups 19 which may receive the feet of the occupant of the seat 13. As the machine progresses over the surface of the soil, the operator who occupies the seat 13 may swing the levers 17 whereby the rods 18 are moved longitudinally and the bell crank levers 15 are swung and consequently the forward portion of the frame 1 is turned to one side or the other in view of the fact that the links 16 are connected with the rear end of the tongue 14 and the forward portion of the said tongue is connected with the neck yokes of the draft animals.

Shafts 20 are journaled upon the yoke 8 and the said shafts are provided with approximately horizontal forwardly extending portions and approximately vertical rear portions. Blades 21 are carried at the lower rear ends of the shafts 20 and a spring 22 connects the forward portions of the shafts 20 together and is under tension with a tendency to normally hold the inner edges of the blades 21 in close proximity to each other. A bracket 23 is mounted upon the intermediate portions of the beams 5 and a shaft 24 is journaled therein. A disk 25 is loosely mounted upon the shaft 24 and is provided at its edge portion with lugs 26 which projects at their ends beyond the opposite sides of the said disk. The disk 25 is provided with a clutch member 27. A clutch member 28 is slidably mounted on the shaft 24 and a spring 29 bears at one end against the said clutch member and at its other end against one end of the bracket 23. The said spring 29 is under tension with a tendency to normally hold the clutch member 28 in engagement with the hub 27 of the disk 25. A bell crank 30 is pivoted upon one of the beams 5 and is provided with an arm which engages the clutch member 28. A lever 31 is pivoted upon one of the beams 5 and a rod 32 operatively connects the said lever with the other arm of the bell crank 30. The occupant of the seat 13 normally holds the upper end of the lever 31 at a rear position whereby the clutch member 28 is held out of engagement with the clutch hub 27 against the tension of the spring 29. A sprocket wheel 33 is mounted upon the shaft 24 and a shaft 34 is journaled for rotation upon the axle 2. A gear wheel 35 is carried by the shaft 34 and meshes with the gear wheel 4 hereinbefore described.

A sprocket wheel 36 is mounted upon the shaft 34 and a sprocket chain 37 is trained around the sprocket wheels 36 and 33. Consequently as the wheels 3 rotate, rotary movement is transmitted through the intermeshing gear wheels 4 and 35 to the shaft and from the said shaft rotary movement is transmitted to the shaft 24 by the springs 29 and sprocket wheels 36 and 33.

Inasmuch as the cutting edges of the blades 21 are normally held in close proximity to each other, as the machine moves along the row of plants the plants are cut out. When the blades 21 arrive at the plant which it is desired to have remain in the row the operator releases the upper end of the lever 31 whereby the clutch member 28 under the influence of the spring 29 engages the hub of the disk 25 and the said disk is caused to rotate with the shaft 24. As the lugs 26 pass between the forward ends of the shafts 20, the forward ends of the shafts are spread against the tension of the spring 22 and the blades 21 are spread apart and thus the plant which is desired to remain in the row is escaped by the blades 21 and after this plant has been passed the upper end of the lever 31 is moved rearwardly whereby the clutch member 28 is moved out of engagement with the hub 27 and the disk 25 comes to a state of rest while the shaft 24 continues to rotate.

Means are also provided for manually opening the blades 21 when it is desired to escape a plant which would otherwise be encountered by the said blades and removed from this soil. These means include a wedge shaped member 40 which is pivoted in the beams 5 and which is provided at one end with a crank 41. The upper portion of the member 40 is located between the forward converging portions of the shafts 20. A rod 42 is pivoted at its rear end to the lever 31 and is provided at its forward end with a loop which receives the crank 41. If while the disk 25 is turning and before the lugs 26 arrive at the forward ends of the shafts 20 the operator should observe that the blades 21 will cut a desirable plant out of the row he swings the upper end of the lever 31 in a forward direction for a short distance whereby the member 40 is swung and comes in contact with the forward portions of the shafts 20 whereby the said shafts are turned in the yoke 8 against the tension of the spring 22 and the blades 21 are opened and the desired plant is left in the row. As the blades 21 move beyond the said plant the upper end of the lever 31 is swung rearwardly and the spring 22 swings the shafts 20 whereby the blades 21 are returned to their normal closed positions.

Having described the invention what is claimed is:—

1. A cotton chopper comprising a wheel mounted frame, beams attached to the frame, blades carried by the beams and spaced from each other, shafts journaled upon the beams, blades carried by the shafts, means for holding the shafts toward each other whereby the edges of the last mentioned blades are normally held in close proximity to each other, a shaft journaled upon the beams, means for rotating said shaft from one of the supporting wheels of the frame, a disk carried by the shaft and having a lug adapted to engage the first mentioned shafts and means for operating the disk intermittently from the second mentioned shaft.

2. A cotton chopper comprising a wheel mounted frame, beams attached to the frame, shafts journaled upon the beams and having forwardly extending portions, a spring connecting said portions of the shafts together, blades carried by the said shafts, a shaft journaled upon the beams, means for operating the last mentioned shaft from one of the supporting wheels, a disk mounted upon the last mentioned shaft and having a lug adapted to engage the first mentioned shafts to spread the same and means for intermittently operating the disk from the second mentioned shaft.

In testimony whereof I affix my signature.

OTTIS LEWIS SUTTON.

Copies of this patent may be obtained for five cents each, by addressing the "Commissioner of Patents, Washington, D. C."